United States Patent
Veale

[11] 3,924,659
[45] Dec. 9, 1975

[54] FAUCETS

[76] Inventor: Charles C. Veale, 950 Canyon View Drive, Laguna Beach, Calif. 92651

[22] Filed: June 19, 1974

[21] Appl. No.: 480,608

[52] U.S. Cl. ... 137/630.17; 137/630.18; 137/630.19
[51] Int. Cl.² .......................................... F16K 11/16
[58] Field of Search..... 137/630.16, 630.17, 630.18, 137/630.19, 630.2, 630.21

[56] References Cited
UNITED STATES PATENTS

| | | | |
|---|---|---|---|
| 1,706,630 | 3/1929 | Newton | 137/630.16 |
| 2,648,350 | 8/1953 | Hagen | 137/630.21 X |
| 2,977,989 | 4/1961 | Meynell | 137/630.19 |

FOREIGN PATENTS OR APPLICATIONS

| | | | |
|---|---|---|---|
| 117,713 | 11/1946 | Sweden | 137/630.2 |

Primary Examiner—Robert G. Nilson
Attorney, Agent, or Firm—Grover A. Frater

[57] ABSTRACT

A single valve operator which is operated in one dimension is used to control two or more valves such that the ratio of flow from two inlet lines is controlled and so that the total combined flow rate is also controlled. The actuator is connected to the elements of those valves so that some have direct connection and others have lost motion connection, such that movement of the operator in that one dimension is used over part of its travel to control rate and over another part of its travel to control ratio. The unit is arranged so that the flow rate can be altered at any flow ratio within the range of ratio control of the unit.

13 Claims, 4 Drawing Figures

U.S. Patent  Dec. 9, 1975  3,924,659
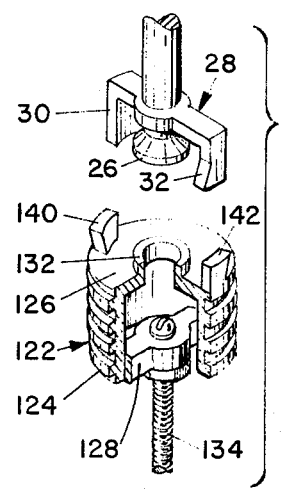
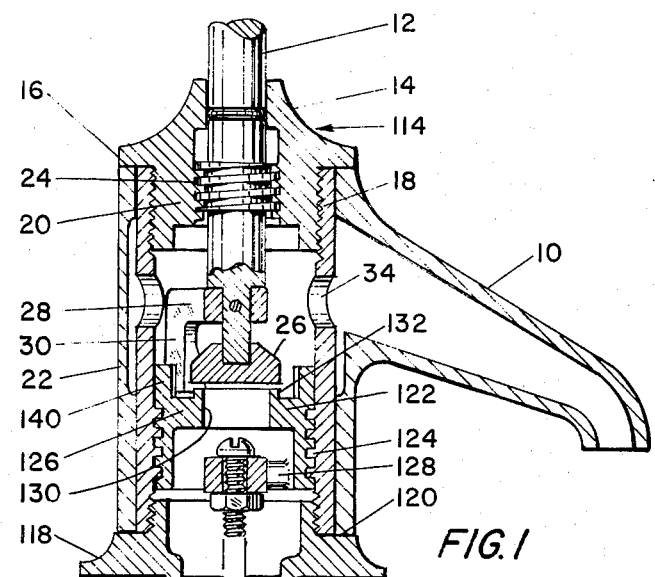
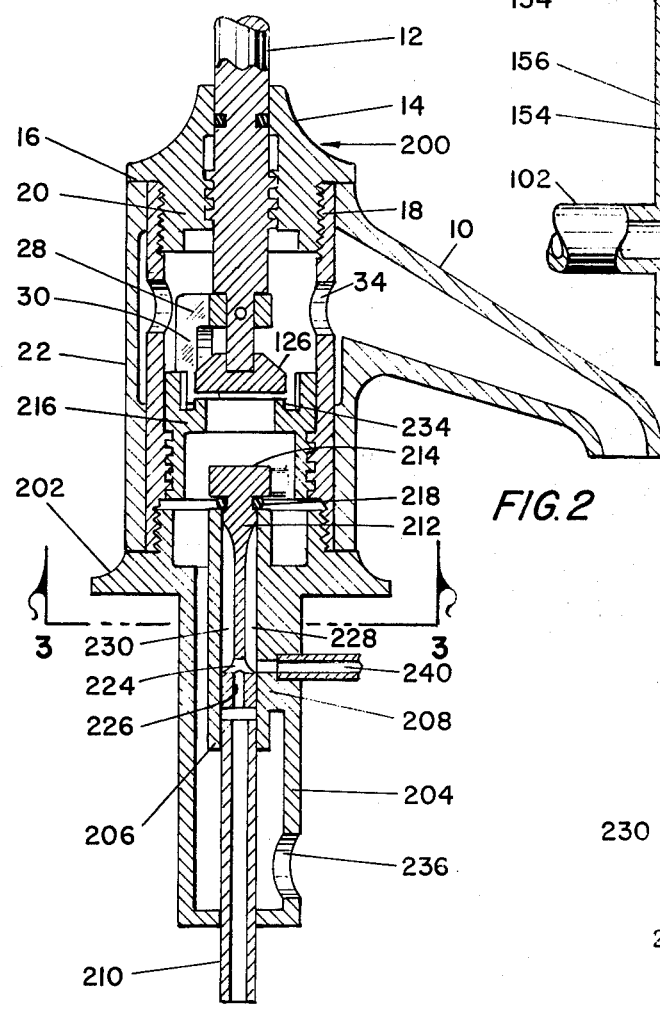
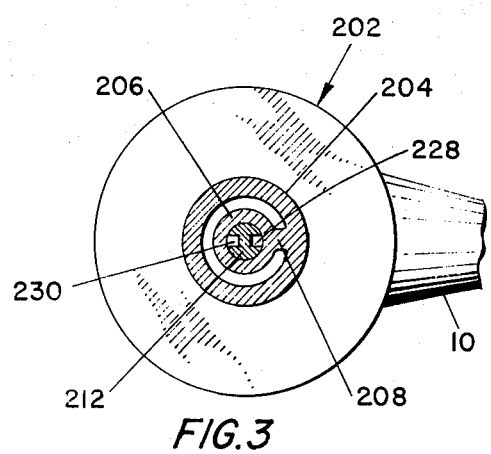

3,924,659

FAUCETS

BACKGROUND

This invention relates to improvements in valves and it relates particularly to a valve by which to control both the combined flow rate and the ratio of the flow rates from two sources, and to do it with a single operating element.

Valves of that kind are generally referred to as "mixing valves." They are commonly used in bathrooms and laundries for mixing hot water with cold water to achieve a flow at a desired intermediate temperature. The same handle, or valve operating element, is used to control the mixture and the flow rate of the mixture. One object of this invention is to provide an improved valve of that kind, not only for mixing hot and cold water, but for use with other liquids in process control applications and the like, and for use as a pilot valve in fluid controller and servo systems.

The invention is particularly well suited to process applications. Those applications do not always involve mixing for the purpose of providing a mixture as an end result. For example, a mixing valve may be used as a proportional adder in a servo control system. Accurate ratio and flow volume control in such applications may be much more important than what is required of the mixing valve of a kitchen sink. Another object of the invention is to provide a mixing valve in which a high degree of accuracy is easily possible.

A wide variety of mixing valve structures have been developed and many of them have been produced for sale. Nonetheless, the invention fills a need previously unfilled. It provides a valve by which ratio of flow and total volume of flow can be very accurately adjusted and in which repeatability is high.

In the past, mixing valves often employed a single handle. They were arranged so that the handle was moved in one dimension to accomplish ratio control and it was moved in another dimension to adjust volume flow. Past valves generally placed no limitation on the sequence in which flow ratio and rate are adjusted. Most prior structures permit adjusting either of those variables first or even permit adjusting them simultaneously, or to alternate the order in completing an adjustment. In the valve provided by this invention, all control motion of the single operating handle is in the same dimension. In the preferred embodiment, that dimension is rotational. The handle is rotated in both directions, but only rotational motion effects rate and ratio. Providing a valve of that kind is another object of the invention. In the preferred embodiment, rotation is translated into lineal motion in one dimension in sets of screw threads. The operator could just as easily be arranged for only rotational or only lineal motion.

Other objects are to provide a valve structure which is capable of production at competitive cost, and which is capable of production in high quantity and reliable form at competitive cost.

SUMMARY

These several objects and advantages are attained by the provision of a valve body arranged so that it defines two separate inlet flow paths that merge and become one, which serves as the outlet flow path of the valve. An outlet valve is included in the outlet flow path. Operation of that valve controls the rate of flow. An inlet valve is included in at least one of the two inlet flow paths. Opening and closing the inlet valve alters the ratio of flow in the two inlet flow paths. The range over which the ratio of flow can be adjusted depends upon other considerations, principally the relative capacity of the two flow paths. Complete ratio control is provided by using an inlet valve in each of the inlet flow paths.

Each of the valves includes a head element and a seat element. One element of each valve is fixed to a common member which is free to move relative to the valve body either rotationally or lineally. The other element of one valve is connected to the valve body. The other element of the other of the valves, the fourth element, and the common member, are arranged so that they are moved by movement of the single operating member, or handle. Either the fourth element or the common member has direct connection to the operating handle, and the other has a lost motion connection. That lost motion connection is arranged, in the preferred embodiment, so that the motion of the "lost motion" is produced by movement of the handle in the same dimension in which the handle is moved to move the member or element that has direct connection to it.

In the preferred embodiment, the dimension for valve handle operation is rotational. Beginning with the valve in zero outlet flow condition, rotation of the handle in one direction through a given degree of rotation results in opening up of the outlet flow valve to permit full flow. Continued rotation of the handle in the same direction adjusts the ratio of flow from the two inlet flow paths. When that rotation of the handle has resulted in the desired ratio of flow, turning the handle in the opposite direction will result in throttling the outlet valve so that the flow rate is adjusted. Given fixed input flow pressures and a dial for indicating control handle position, the condition of rate of flow and the condition of total flow can be reproduced as accurately as the handle can be positioned with respect to that dial.

In the preferred form of the invention, the valve body is formed with a cavity at least a section of which is cylindrical. The wall of the body surrounding that cylindrical cavity is threaded and the external threads of the generally cylindrical "travelling member" engage the threads of the valve wall so that rotation of the travelling member results in its translation relative to the valve body along the axis of the travelling member. That travelling member is fitted with a central flow opening and the flow opening is surrounded by the seat of the outlet valve. The operating member or handle is threadedly engaged in the valve body and is rotational about an axis that is coincident to the axis of the travelling member. The head of the outlet valve is fixed to the operating handle so that the operating handle may be rotated to bring the head into seating engagement with the valve seat. In the preferred embodiment, the travelling member is fitted with an arm, preferably two arms, which are located one on each side of the outlet valve seat. The operating handle is fitted with driving means in the form of another arm or dog which engages the arms of the travelling member. The driving arms, and the driven arms, have dimensions such that there is a lost motion connection between them. That lost motion connection results from the fact that the combined width of the driving arms and the driven arms forms less than a complete circle. When the driving arm is rotated from a position of engagement with one side of the driven arm, it must be turned through some distance before the opposite sides of the driving arm engages the opposite side of the driven arm.

In the preferred embodiment, one element of the inlet valve is carried by that travelling member and it cooperates with the other element of the inlet valve. That other element has fixed connection to the valve body. The inlet valve elements can be arranged so that the valve opens in response to rotation of the handle in the same direction that opens the outlet valve or the operation can be reversed so that the inlet valve tends to close by rotation of the handle in the direction that tends to open the outlet valve. The first described of those alternatives has wider application than does the one described above.

Thus arranged, the structure responds to rotation of the operating handle so that the degree of opening of the inlet valve is not altered while the degree of opening of the outlet valve is being changed. Conversely, the degree of opening of outlet valve remains unchanged when the degree of opening of inlet valve is being unchanged. If there are two inlet valves, one in each of the inlet flow paths, they are ordinarily arranged so that one of them tends to close when the other is being opened.

The preferred embodiment employs a rotatable handle and screw threads to operate the valves as a consequence of lineal translation of the valve elements. While that is preferred for several reasons, if such vernier action is not required, the valve elements can be arranged for operation by relative rotation or the threads can be omitted and lineal motion of valve elements can be accomplished by lineal motion of the operating handle.

In the drawings:

FIG. 1 is a cross-sectional view of a valve, less its operating handle, which embodies the invention;

FIG. 2 is a cross-sectional view of an alternative form of the valve shown in FIG. 1;

FIG. 3 is a cross-sectional view taken on line 3—3 of FIG. 2; and

FIG. 4 is an exploded view of some of the internal parts of the valve of FIG. 1.

Some of the elements of these two embodiments are common. Those elements have been given reference numerals in the range between 10 and 100. Those elements that are peculiar to the embodiment of FIG. 1 have been given reference numerals in the range from 100 to 200, and numerals in the range from 200 to 300 have been used to designate those elements that are peculiar to the embodiment of FIG. 2.

Turning first to FIG. 1, the valve there shown has two fluid inlets 100 and 102. Fluid entering those inlets is discharged at the common spout 10. The total quantity of fluid that passes through the valve and the proportions that come from inlets 100 and 102 is controlled by the rotational position of a single operating member 12. In this case, member 12 is a stem connected at its upper end at a handle, now shown, and which extends down into the body of the valve. The body, which is generally designated 114 in the case of the valve of FIG. 1, is formed by a faucet cap 14 which is symmetrical about a central axis. That axis is coincident with the axis of the stem 12 and of all of the moving parts.

The lower end of the faucet cap has reduced diameter so that a shoulder 16 is formed against which a pair of sleeves abut when the valve is assembled. The sleeves are concentric. The inner sleeve is identified by the reference numeral 18. It is internally threaded at both of its ends. At its upper end it is threadedly engaged with external threads at the lower portion 20 of the faucet cap.

At its lower end, the valve of FIG. 1 is provided with a faucet base 116 which is generally symmetrical about a central axis coincident with the axis of the two sleeves and the stem 12. The faucet base includes a flange 118, the lower surface of which serves as a mounting surface and the upper surface of which is a shoulder 120. It faces shoulder 16 and abuts against the lower end of the inner sleeve 18 when the valve is assembled. The upper portion of the faucet base has reduced diameter above the shoulder 120 and is provided with external threads which are mated with the internal threads at the lower end of sleeve 18. The outer sleeve 22 is cylindrical except that it has the spout 10 extending off at one side and its inner wall is recessed to permit flow to the spout if the two sleeves are oriented to place the outlet of sleeve 18 other than opposite the spout, or if the outer sleeve and spout are rotatable. The length of the outer sleeve is equal to or slightly greater than the length of the inner sleeve 18 so that in assembled condition, the upper and lower rim of the outer sleeve 22 are clamped tightly between shoulders 16 of faucet cap 14 and shoulder 120 of faucet base 116.

The faucet cap, the two sleeves, and the faucet base, make up the valve body. That body defines a central cylindrical cavity bounded above by the faucet cap 14 and below by the base 116 and circumferentially by the inner surface of sleeve 18.

The cavity contains a travelling member 122. Its upper portion is generally cylindrical. The external surface is threaded and the threads are mated with threads formed on the inner surface of inner sleeve 18. In FIG. 1, those threads are shown to be square and they are identified by the reference numeral 124. The stem 12 is formed with threads on its external surface and those threads are identified by the reference numeral 24. They are threaded into corresponding threads formed on the inner surface of faucet cap 14. That faucet cap has a central bore through which the operating member or stem 12 extends and the threads are formed on the inner surface of that bore.

The travelling member 122 resembles a sleeve except that it has a web 126 extending across its inner diameter near its upper edge, and it has a spider 128 extending across its inner diameter near its lower end. The web 126 is formed with a central bore, the wall of which is designated 130. An upper projecting lip 132 extends around the periphery of that bore and that lip serves as the seat of a flow volume control valve whose head 26 is fixed to the lower end of stem or operating member 12.

The travelling member is shown in FIG. 4. Part of it is cut away so that the spider 128 may be seen more clearly. It is shown in FIG. 4 to be two spoked having a bolt 134 fixed to its hub. Returning to FIG. 1, bolt 134 extends down through the lower cylindrical portion of the faucet base 116. That lower cylindrical portion houses a cylindrical spool 138 which is fixed to the lower end of the bolt 134. The spool 138 rotates within the cylindrical housing 136 when the travelling member 122 is rotated. Because of the threaded interconnection between that travelling member and the inner sleeve 18, rotation of the travelling member results in its being translated in the direction of the central axis of the structure and the spool 138 experiences a similar translation relative to the lower cylindrical housing 136.

The travelling member 122 has a lost motion connection to the operating element 12. That connection is formed by a yoke 28 which is fixed to the lower end of stem 12. In this embodiment, the yoke is formed with two dogs 30 and 32 which straddle the valve head 26. The dogs extend downwardly to the level of a pair of ears 140 and 142 which stand upwardly from the margins of the upper face of travelling member 122 at diametric points. The outer, downwardly extending dogs 30 and 32 of the yoke serve as driving members and the ears 140 and 142 serve as driven members in the lost motion connection. The combined width of the ears and dogs extends over less than 360°, hence the lost motion connection. In this embodiment, the combined width of the driving and driven members occupies an angular segment of about 30° measured from the central axis of the unit on each side of the axis so that the stem is rotated to about 150° from a position in which one side of the dogs 30 and 32 leave contact with the ears 140 and 142 before those ears are again contacted by the driving dogs. Rotation of the stem through that 150° angle translates the stem 12 and head 26 in the direction of the axis of stem 12 because of the threaded interconnection between the stem and the faucet cap 14. Throughout that 150° of stem rotation, head 26 is translated along the direction of the axis toward or away from seat 132 of the travelling member from a position in which the head 26 closes upon the seat 132 to a position in which it is withdrawn fully from that seat. Thus it is that rotation of the stem 12 results in closing and opening of the main flow valve formed by head 26 and seat 132.

If the stem 12 is rotated beyond the point at which the dogs 30 and 32 of the yoke engage the ears 140 and 142 of the travelling member, then rotation of the stem will result in rotation of the travelling member. Because of its threaded interconnection with the inner sleeve 18, rotation of the travelling member results in its being translated along the central axis of the unit. Clockwise rotation of the operating stem 12 tends to close the main flow valve and, after the dogs engage the ears, to result in downward translation of the travelling member 122. Subsequent rotation of the operating stem 12 in a counterclockwise direction will remove the driving dogs from the driven ears so that the travelling member is not driven until the stem has been rotated approximately 150° when the dogs again engage the ears. During that 150° rotation, the stem 12 is translated upwardly to carry the head 26 away from the now stationary seat 132. However, after that 150° of rotation has been completed and the dogs 30 and 32 again engage ears 140 and 142, continued counter-clockwise rotation of the operating stem 112 will result in rotation of the travelling member and its translation upwardly with the head. The pitch of the threads that interconnect the travelling member and the inner sleeve 18 is approximately the same as the pitch of threads 24 which interconnect the stem 12 and the faucet cap 14. Thus, the flow rate valve remains open in substantially the same degree when the travelling member is being rotated.

Upward and downward translation of the travelling member 122 results in upward and downward translation of the bolt 134. Because the bolt 134 is fixed to the spool 138, the spool is translated upwardly and downwardly with translation of the travelling member 122. The spool 138 is provided with two sets of grooves separated by a land. The interior of the spool is hollow and communication is afforded from the grooves to the interior of the spool. The lower groove is identified by the numeral 150. Communication from that groove to the interior of the spool is afforded through a pair of openings one of which is visible in FIG. 1 where it is identified by the reference numeral 152. As shown in FIG. 1, when the travelling member is in its lower position, groove 150 lies opposite the inlet 102 permitting flow of fluid from the inlet 102 into the groove 150 and through the hole 152 into the interior of the spool from whence it flows upwardly and passes the spider 28 and flows through the bore 130 and seat 132 and past the head 26 and through an opening 34 in the inner sleeve 18 to the spout 10.

The upper groove in FIG. 1 is identified by the numeral 154. Fluid is free to flow from that groove to the interior of the spool through an access opening 156. When the travelling member 122 occupies the position that it is shown to have in FIG. 1, the groove 154 is below the point at which the inlet 100 intersects with the inner wall of lower housing 136. Consequently, flow from inlet 100 is precluded. In this embodiment, the valve stem 12 may be rotated sufficiently to elevate travelling member 122 and spool 138 to a point where the grooves 150 and 154 lie midway across the inlet openings 102 and 100, respectively. Continued counterclockwise rotation of the operating stem 12 will lift the travelling member 122 and spool 138 until the groove 150 lies above the inlet 102 precluding flow therefrom. At that time, the groove 154 will be fully aligned with the inlet 100 so that full flow from that inlet is permitted. Thus, the flow from the two inlets 100 and 102 can be adjusted so that all of the flow comes from one, so that all of the flow comes from the other, or so that flow proceeds from both inlets in any ratio.

The operation is reviewed as follows:

In this embodiment, approximately 150° of operating stem rotation are available to control the total flow rate by altering the position of head 26 relative to seat 132. Beginning from the closed position of that valve or the open position of that valve, 150° of rotation are available to adjust flow rate without altering the ratio of flow from inlet lines 100 and 102. However, rotation beyond that 150°, in fact any rotation following an engagement by driving dogs with the driven ears, results in translation of the travelling member 122 so that the ratio of flow from the valve 100 and 102 is altered. Let it be assumed as an initial condition that the travelling member is in its lower most position as shown in FIG. 1. Clockwise rotation of the stem 12 will result in enclosure of the rate control valve which comprises head 26 and seat 132. When the valve is closed further clockwise rotation will be precluded because the spool 138 will bottom against the lower end of the housing 136. Thereafter, counterclockwise rotation of the stem 12 will result in full opening of the head 26 from seat 132. When the dogs 30 and 32 engage ears 140 and 142, the relative motion between head 26 and seat 132 ends. Fluid entering inlet 102 flows up through the unit and out at the spigot 10 and there is no flow from inlet 100. Continued counterclockwise rotation of the stem 12 produces no relative movement between the head 26 and 132 and the rate valve remains fully open as the spool is lifted and the ratio of flow is altered to decrease the amount of flow from inlet 102 relative to the flow from inlet 100. When the selected ratio of flow from the two inlet openings is reached, counterclockwise rotation is stopped. If, now, it is desired to reduce the flow rate, it is necessary only to reverse the direction of rotation of stem 12 and to rotate it to bring the head 26 closer to seat 132. Such clockwise rotation permits adjustment of the output flow rate in any desired degree down to the point where flow is totally stopped. In a hot and cold water mixing application, if the temperature is to remain the same but flow is to be increased, it is simply necessary to reverse the rotation of the stem 12. However, rotation beyond the full open position or the full closed position of the flow rate valve results in the adjustment of the ratio of flows.

Inspection of FIG. 4 will show that one face of the dogs 30 and 32 is vertical. The other face tapers to a greater width toward the end of the dogs. Inspection of the ears 140 and 142 will show that they, too, have a vertical side and a side that tapers to greater width toward the upper end of the ear. The taper of the dogs and the taper of the ears cooperates to insure that the valve head 26 can be seated against seat 132 despite small deviations from the design dimensions of the parts. In the preferred embodiment, that arrangement of sloping, interconnecting faces is coupled with a thread construction that makes the pitch of threads 24 slightly greater than the pitch of threads 124. It is not necessary to provide the sloping faces on the dogs and ears on their opposite sides because engagement with those sides, the vertical sides, results in opening of the valve and full open position need not be controlled as precisely as the valve closed and sealed condition.

Turning to FIG. 2, the upper part of that valve is the same as the upper part of the valve shown in FIG. 1. Common parts have common numerals. The housing 200 differs from housing 114 only in that the faucet base 202 is constructed differently. Its lower housing 204 is similar to housing 118 with the exception that its lower housing 204 has a cylindrical interior within which a cylindrical sleeve 206 is disposed. That sleeve 206 is fixed relative to the lower housing 204 and in the preferred embodiment it is integrally formed with the housing and attached to it by a web 208. The web extends vertically between the inner wall of the housing and the outer wall of the cylinder 206 along one edge of the latter. The inner sleeve has a cylindrical bore into which the upper end of an inlet flow line 210 is press fitted or otherwise secured. The lower end of the flow line 210 extends through the bottom wall of the lower housing 204. The cylindrical sleeve 206 has a smooth inner bore. That bore is occupied, in the region above the upper end of inlet line 210, by a rod 212.

While actually constructed as an assembly of parts, for the sake of clarity, rod 212 is depicted as a downward extension integrally formed with the hub 214 of a spider that corresponds with spider 128 in FIGS. 1 and 4. The spider 214 is housed in the cylindrical center cavity of a travelling member 216 which, except for the hub 214 and rod 212 and a sealing element 218, is identical to the travelling member 122 of FIG. 1 and FIG. 4.

The rod 212 is formed with a cross bore 224 near its lower end. A small bore 226 extending axially into the lower end of the rod 212 intersects with it. Beginning at the cross bore 224 and extending to a point just below the O-ring seal 218, rod 212 is formed with two grooves that extend vertically at diametric points along the length of the rod. Those two grooves are visible in FIG. 3. They form flow paths for fluid entering at line 210. Fluid flows up into the space within the inner cylindrical sleeve 206 just above the upper end of line 210 and the lower end of the rod 212. It flows upwardly through the upper central bore 226 up to the cross bore 224 and then up in the two grooves 228 and 230. Fluid cannot escape from those grooves unless the rod is lifted so that the upper end of the grooves clears the upper rim 242 of the cylindrical sleeve 206. When the rod is so lifted, flow from line 210 can proceed into the cavity surrounding the upper end of sleeve 206 and from there up through the seat 234 of the flow rate control valve whose valve head is formed by head 26 in FIG. 2.

The lower end of housing 204 of the faucet base 202 is provided with an inlet opening 236. Fluid entering that opening is free to flow around the inlet line 210 and through the space between the inner wall of housing 204 and the outer wall of the cylindrical sleeve 206 up into the space within the travelling member 216. From there it can flow through the rate control valve formed by head 26 and seat 234. This particular embodiment includes an auxillary flow line 240. Its opening is positioned so that it is at the level of the cross bore 224 when the rod 212 is in its lower most position as shown in FIG. 2. The diameter of line 240 is no greater than the distance of the top of the grooves 230 and 228 to the top of the inner sleeve 206. Thus, the opening 240 is closed by the lower end of rod 212 just before the grooves 228 and 230 are raised to the level of the upper end of 242 of sleeve 206.

When the several parts of the valve have the position shown in FIG. 2, fluid entering line 210 from below is free to flow upwardly into the lower bore 226 and the cross bore 224 and the grooves 228 and 230 of rod 212. That fluid is free to flow out of those cavities through the opening 240. If the travelling member 216 is rotated in a direction to lift the rod 212 the lower end of rod 212 begins to close off outlet 240. When the outlet is completely closed the upper end of the grooves 228 and 230 will have reached the point just below the upper rim 242 of the inner sleeve 206. Any further motion of the travelling member to raise the rod will expose the upper portions of the grooves 228 and 230 so that flow then can proceed from inlet line 210 out of those grooves into the interior of the travelling member as previously described. The upper ends of the grooves are tapered so that the volume of flow from the grooves is variable and will increase as the rod 212 is lifted in greater degree.

Both units, the one shown in FIG. 1 and the one shown in FIG. 2 are arranged so that there are two inlet flow paths. In the case of FIG. 1, those inlets are designated by the numerals 100 and 102. In the case of FIG. 2, the inlets are inlet opening 236 and inlet line 210. Those inlet lines are connected in parallel and they open ultimately to a common flow path through the flow rate control valve. In the case of FIG. 1, the flow rate control valve is formed by head 26 and seat 132.

In the case of the valve of FIG. 2, the flow rate control valve is formed by head 126 and seat 234. In the case of FIG. 1, movement of the travelling member 122 operates spool 138 so that it provides a valve action in both of the lines. In the case of FIG. 2, movement of the travelling member 216 operates the rod 212 so that it controls flow from line 210, but there is no control below the flow rate control valve of the flow that enters in at 236. In FIG. 2, the degree of control of the ratio of the two inlet lines is not as complete as it is in the case of the unit of FIG. 1. Nonetheless, there is some control of that ratio.

The valve of FIG. 2 is intended to serve as a servo mechanism control element or pilot valve. One application for that unit is in controlling the fluid mixing apparatus disclosed in Charles C. Veale U.S. Pat. No. 3,805,836, entitled, Fluid Pressure Responsive Position Control. Outlet 53 of the unit shown in FIG. 2 of that patent would be connected to inlet 236 of the valve of FIG. 2. The ratio control valve formed by grooves 228 and 230 and the upper rim of the inner sleeve 206 would be substituted for valve 90 in FIG. 2 of the patent. To do that, line 210 would be connected so that it serves as passageway 78 of the unit shown in FIG. 2 of the patent.

In a system that includes several temperature controlling faucets similar to the one shown in FIG. 2 hereof, all connected to one fluid pressure responsive position control unit of the kind described in said Veale patent, it may be necessary to incorporate safety features. For example, when faucets of the kind shown in FIG. 2 hereof are used for controlling bath showers, wash basins and kitchen sink faucets, it may be necessary to provide circuitry which will prevent scalding. Opening 236 of each faucet would be connected as the common discharge flow path to opening 53 of the apparatus shown in FIG. 2 of said Veale U.S. Pat. No. 3,805,836. The opening from flow path 78 of that apparatus would be connected to pipe 210 of the first faucet of the kind shown herein. Pipe 240 from that first faucet would be connected to pipe 210 of a second faucet. The pipe 240 of that second faucet would be connected to pipe 210. Pipe 240 of the last faucet would be plugged. The first faucet in that series would serve as a master and ordinarily would be used to control a bath shower. When that faucet was turned on the other faucets of the system would be inactive in that they would be ineffective to control the temperature of water issuing from them. When the first faucet is turned on the water discharged from the other faucets has a temperature determined by the adjustment of the master faucet. When that master faucet is closed the other faucets are capable of controlling the water discharge from them.

In a mixing system like that shown in said Charles Veale patent which incorporated faucets shown herein, line 240 of those faucets would be connected in a manner to insure that operation of the control element 12 of faucets other than the master faucet would not alter the ratio of hot and cold water. In this example, line 240 of the master faucet would be closed off to isolate the mixing valve so that the position of the mixing valve piston could not be changed.

Returning to FIG. 1, in the preferred embodiment the long bolt 134 is made of a material that has a high coefficient of expansion with temperature. Its length is changed if the temperature of the water surrounding it is changed. If, after the temperature has been adjusted, the temperature of the inlet hot water or inlet cold water should change significantly, that change would be sensed as a change in length of the bolt 134. The effect of that change would be to move spool 138. If the temperature should increase, the bolt would be elongated, tending to shut off inlet 100 and open inlet 102. When the bolt 134 is to be used as a temperature compensating element, inlet 100 is the hot water inlet and inlet 102 is the cold water inlet. While an expansionable bolt 134 is shown in FIG. 1, it will be apparent that other configurations are possible. Examples are gas, liquid and wax filled sensors and bimetallic devices.

In the embodiments shown, the valves are operated by rotational movement that is translated into linear movement of the valve elements. It will be apparent that an alternative lost motion connection could be made between the stem 12 and the travelling member and the threads could be omitted so that the valves could be operated by lineal movement of the operator rather than rotational movement. On the other hand, it will be apparent that valves operated by rotation movement could be substituted for those shown in these embodiments. In addition, it will be apparent that the position of the several head and seat elements could be reversed. Those modifications fall within the scope of the invention although the forms selected for illustration are preferred and constitute special features of the invention.

The inclusion of the sloping surfaces as a part of the arms 30 and 32 is preferred in valves which are operated by rotational movement of the handle. In this connection, the terms "slope" and "sloping" are intended to serve as generic terms for a number of configurations that can be employed to accomplish the desired result. If the pitch of the threads 24 and 124 is different, either by accident or by design, some differential motion between the driving dogs and the driven ears is required for proper seating of the valves. That differential motion could be produced by the inclusion of a resiliant member in the connection between the dogs and the ears, or elsewhere in the system, as for example between the stem 12 and the head 26. Accomplishing the result by special shaping of one face of either the dogs or the ears or both provides the simplest solution and is preferred. It will be apparent to those skilled in the art that other shapes can be employed to accomplish the result. The form selected for illustration is readily manufactured and imposes a minimum manufacturing tolerance requirement and is the preferred form.

I claim:

1. A valve for controlling both the combined flow rate and the ratio of the flow rates from two sources using a single operating element comprising in combination:

a valve body defining two separate inlet flow paths which combine to form a single outlet flow path;

first and second valves each comprising cooperating head and seat elements, one of said first and second valves being located in one of said inlet flow paths and the other of said first and second valves being located in said outlet flow path;

a valve operator moveable in each of two directions; and valve actuating means responsive to movement of said valve operator in one of said two directions for opening said first valve and, when said first valve is opened in given degree, for actuating said second valve in said one direction, said valve actuating means being further responsive to movement of said valve operator in the other of said two directions for closing said first valve and, when said first valve is closed, for actuating said second valve in an opposite direction.

2. A valve for controlling both the combined flow rate and the ratio of the flow rates from two sources using a single actuator, comprising in combination:

a valve body defining two separate inlet flow paths which combine to form a single outlet flow path;

an inlet valve comprising cooperating head and seat elements in one of said separate inlet flow paths;

an outlet valve comprising cooperating head and seat elements in said outlet flow path;

one element of one of said valves being fixed to said valve body;

a valve operator moveable in each of two directions;

valve actuating means responsive to movement of said operator in one of said two directions for opening said outlet valve and, when said outlet valve is opened in given degree, for actuating said inlet valve in one direction; and said valve actuating means being responsive to movement of said operator in the other of said two directions for closing said outlet valve and, when said outlet valve is closed, for actuating said inlet valve in an opposite direction.

3. The invention defined in claim 2 in which said one element which has fixed connection to the valve body is one element of the inlet valve and in which one element of said outlet valve is carried by and moveable with said valve operator.

4. The invention defined in claim 3 in which said valve actuator comprises a moveable travelling member in which the other element of the inlet valve and the other element of the outlet valve are mounted and are fixed against movement relative to one another and are moveable together relative to said body and relative to said one element of the inlet valve.

5. The invention defined in claim 4 in which said valve actuating means comprises the fixed connection between the one element of the inlet valve and the valve operator, said valve actuating member further comprising lost motion means for establishing a lost motion connection between said travelling member and said valve operator.

6. A valve for controlling both the combined flow rate and the ratio of the flow rates from two sources using a single actuator, comprising in combination:

a valve body defining two separate inlet flow paths which combine to form a single outlet flow path;

an inlet valve comprising cooperating head and seat elements in one of said separate inlet flow paths;

an outlet valve comprising cooperating head and seat elements in said outlet flow path;

one element of one of said valves being fixed to said valve body;

a valve operator moveable in each of two directions;

valve actuating means responsive to movement of said operator in one of said two directions for opening said outlet valve and, when said outlet valve is opened, in given degree, for actuating said inlet valve in one direction;

said valve actuating means being responsive to movement of said operator in the other of said two directions for closing said outlet valve and, when said outlet valve is closed, for actuating said inlet valve in an opposite direction;

said valve body being formed with an internal cavity the walls of which are threaded to receive a travelling member having external threads engaged in the threads of said walls;

said rotatable travelling member having external threads engaged in the threads of the wall and having an opening formed therethrough, the seat element of said outlet valve surrounding said opening; and said valve operator having fixed connection to one of said travelling member and said inlet valve head element and a lost motion connection to the other of said travelling member and said inlet valve head.

7. The invention defined in claim 6 in which one element of the inlet valve is fixed to said valve body and the other element of said inlet valve is fixed to said travelling member.

8. The invention defined in claim 7 in which said valve actuator is threadly engaged by said valve body and is rotatable on an axis coincident with the axis of rotation of said travelling member.

9. The invention defined in claim 7 in which the head element of the outlet valve is fixed to said valve operator;

said valve actuating means further comprising a drive element carried by and rotatable with said valve actuator and driven means carried by said travelling member and engageable with said drive element for rotating said travelling member in a degree proportional to rotation of said drive element only after a given degree of rotation of said drive element following a change in rotational direction of said drive element.

10. The invention defined in claim 9 in which said travelling member is generally cylindrical having a central flow opening surrounded by the seat of said inlet valve;

said driven means comprising an ear fixed to and extending from said travelling member;

the drive element having dimensions to engage one side of said ear only after a given degree of rotation from disengagement from the other side of said ear.

11. The invention defined in claim 10 in which said actuating member is threadly engaged to said body;

said valve actuating means further comprising means in the form of complementary sloping engaging surfaces on said drive element and on said ear for compensating for differences in the lead of the threads of said actuating member and the threads of said travelling member.

12. The invention defined in claim 9 which further comprises a second inlet valve located in the other of said inlet flow paths and comprising head and seat elements one fixed to said valve body and the other carried by said travelling member;

said inlet valve elements being positioned such that rotation of said travelling member in one direction tends to close one of said inlet valves and to open said one of said inlet valves.

13. A valve for controlling both the combined flow rate and the ratio of the flow rates from two sources using a single actuator, comprising in combination:

a valve body defining two separate inlet flow paths which combine to form a single outlet flow path;

an inlet valve comprising cooperating head and seat elements in one of said separate flow paths;

an outlet valve comprising cooperating head and seat elements in said outlet flow path;

one element of one of said valves being fixed to said valve body;

a valve operator moveable in each of two directions;

valve actuating means responsive to movement of said operator in one of said two directions for opening said outlet valve and, when said outlet valve is opened in given degree, for actuating said inlet valve in one direction;

said valve actuating means being responsive to movement of said operator in the other of said two directions for closing said outlet valve, and, when said outlet valve is closed, for actuating said inlet valve in an opposite direction; and a second inlet valve comprising head and seat element;

one element of each of said inlet valves being fixed to the valve body;

the other element of each of said inlet valves and one element of said outlet valve being fixed relative to one another and moveable with said valve actuating means;

said elements of said inlet valves being positioned such that one inlet valve tends to close and the other inlet valve tends to open in response to movement of said actuating means.

* * * * *